May 3, 1960 J. H. DIENER 2,935,362

DRIVE SHAFT BEARING SUPPORT

Filed Oct. 12, 1956 2 Sheets-Sheet 1

INVENTOR.
James H. Diener

BY L. D. Burch
ATTORNEY

May 3, 1960 J. H. DIENER 2,935,362

DRIVE SHAFT BEARING SUPPORT

Filed Oct. 12, 1956 2 Sheets-Sheet 2

INVENTOR.
James H. Diener

BY L. D. Burch

ATTORNEY

United States Patent Office 2,935,362

Patented May 3, 1960

1

2,935,362

DRIVE SHAFT BEARING SUPPORT

James H. Diener, Lansing, Mich., assignor to General Motors Corporation, Detroit, Mich., a corporation of Delaware Application October 12, 1956, Serial No. 615,662

4 Claims. (Cl. 308—28)

This invention relates to drive shaft bearing supports in general and more particularly to such bearing supports as are used with two-piece vehicle drive shafts.

In lowering the over-all height of automotive vehicles it has been found desirable to have a two-piece vehicle drive shaft connected by universal joint means and disposed to extend the drive line lower than normal with the end of the forward drive shaft section mounted in bearing means to prevent movement thereof. Such bearing means and their supports have taken various forms.

It is here proposed to provide a drive shaft bearing support which also includes drive noise insulating or isolating characteristics. In the absence of such latter feature road noises and axle and drive noises are usually transmitted through the bearing support to the vehicle frame and hence to the vehicle body, much to the annoyance of vehicle passengers.

The proposed bearing support includes a ball bearing member receivable about the end of the forward drive shaft section within a two-piece flange sectioned bearing retainer member. The bearing retainer member is clamped about the bearing and has outwardly extended ears which are secured to a mounting plate that depends toward a support bracket. The support bracket is spaced apart from the mounting plate and has a vertical flange disposed in parallel relation thereto. The mounting plate and bracket flange are secured together by elongated members having vibration damping characteristics and thereby adapted to intercept and damp out all vibration normally transmitted through the drive shaft to the vehicle as well as to alter the resonant character of the drive shaft itself. The insulators also serve to support the bearing assembly and hold the forward drive shaft section against undue movement adversely affecting the operation of the universal joint connection.

Figure 1:
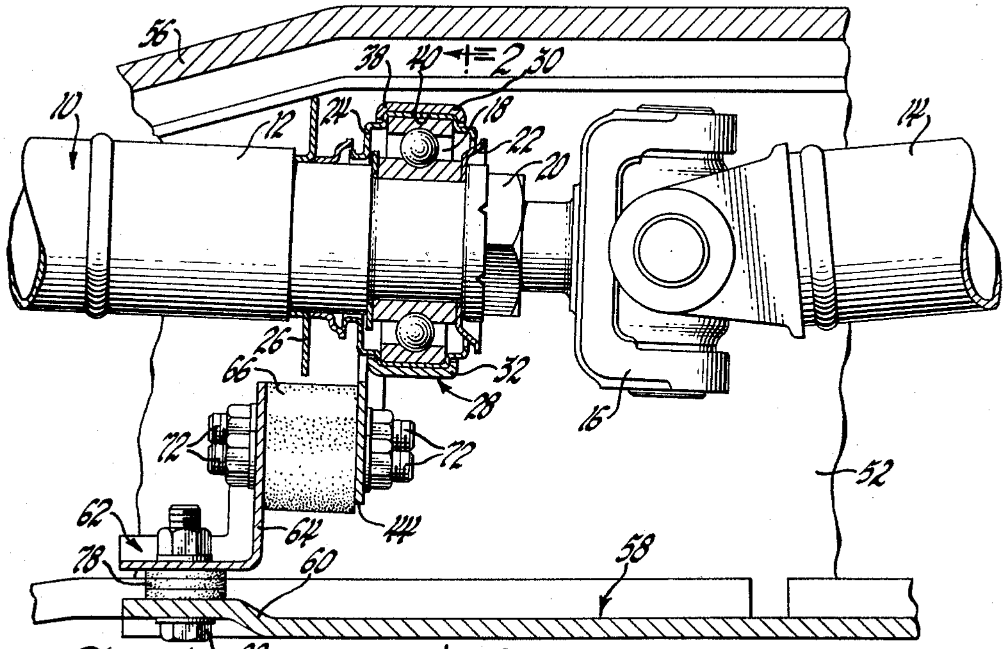
Figure 1 is a side view of a vehicle drive arrangement making use of the proposed bearing support.
Figure 4:
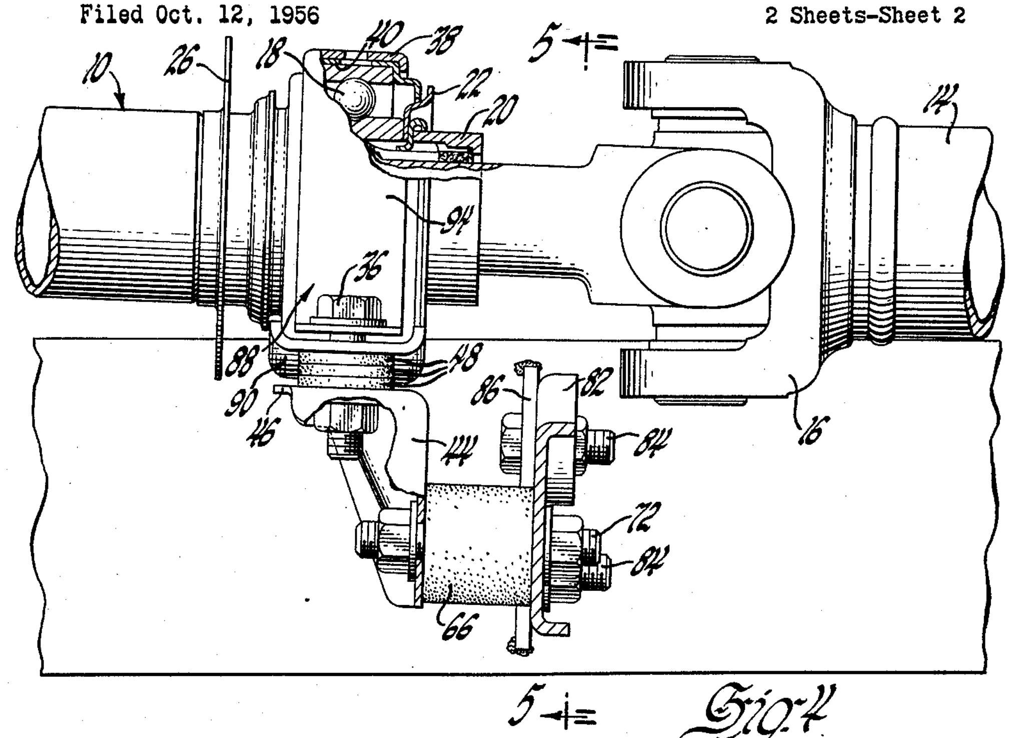
Figure 4 shows the proposed bearing support as adapted for use with a different mounting bracket.

The vehicle drive shaft 10 of Figures 1 and 4 includes a forward drive shaft section 12 connected to an after drive shaft section 14 by a universal joint 16. A ball bearing member 18 is disposed about the end of the forward drive section 12 just forward of the joint 16.

A lock nut 20 of one sort or another is used to seat the inner race of bearing 18 on the end of the shaft and dirt seals 22 and 24 are disposed on opposite sides thereof to prevent the entry of foreign substance between the bearing races. A flinger 26, comprising an annular

2 flange located on the drive shaft forwardly of the bearing member also serves to deflect dirt otherwise received within the bearing.

Figure 2:
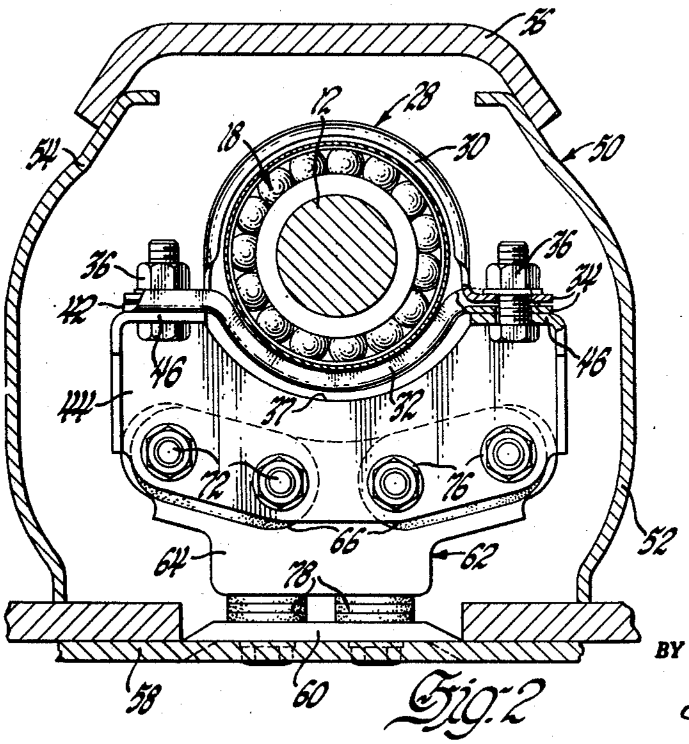
Figure 2 is a front view of the proposed bearing support as seen in the plane of line 2—2 of Figure 1, looking in the direction of the arrows thereon.

The bearing support of Figures 1 and 2 includes a bearing retainer member 28 comprising flange sectioned semicircular bands or rings 30 and 32 receiving the bearing therebetween and including extended ears or tabs 34 which are secured together, as by fasteners 36, to clamp the bearing therebetween. The flanged side walls 38 of the bearing retainer members 30 and 32 serve to provide an annular groove 40 received about the outer race of the bearing member. The spacing 42 between the ears 34 shows the clamping tolerance provided.

A mounting plate 44, which depends from the bearing retainer member 28 and includes a flange 46 serving as a mounting pad for the retainer ears 34, is secured to the retainer by the same fasteners 36 engaging the respective ears of the retainer bands together. The mounting plate is cut or formed away from the bearing and bearing retainer assembly, as at 37, leaving the ends raised to receive the retainer ears while the rest of the assembly is spaced apart therefrom. Spacers 48, of rubber or similar material if desired, as shown by Figure 4, may be used to alter the relative disposition of the mounting plate 44 to the bearing retainer 28 and also to serve as a secondary damping means.

The bearing support means of Figures 1 and 2 is shown as disposed within a drive shaft tunnel section 50 of a vehicle frame. In the present instance the tunnel section is comprised of converging or intersecting frame braces 52 and 54 tied together by reinforcing plates 56 and 58. The bottom plate 58 includes a portion 60 offset within the tunnel section and acting as a mounting pad for the bearing support bracket 62.

The bearing support bracket 62 includes a vertically disposed flange 64 spaced apart from and in parallel relation to the mounting plate 44 depending from the bearing and bearing retainer assembly. The bracket is secured to the mounting plate with insulators 66 disposed therebetween.

Figure 3:
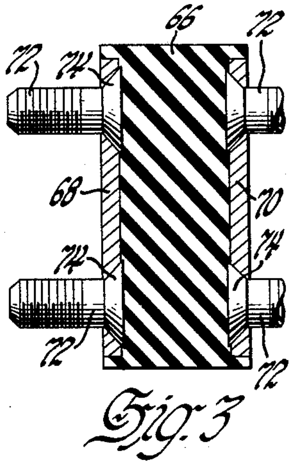
Figure 3 is a cross-sectioned view of one of the insulator members.

Insulators 66, as shown by Figure 3, include elongated biscuit like members, preferably of rubber or synthetic composition, having plates or discs 68 and 70 bonded to opposite side faces thereof. Threaded fasteners 72, having their headed ends 74 within the insulator, extend through the discs on opposite sides of the insulator. The fasteners do not extend all the way through the insulators but only through separate side faces thereof. Threaded nuts and lock washers 76 retain the fasteners 72 to the mounting plate 44 and support bracket flange 64.

In the support means of Figures 1 and 2 spacers 78 are used between the frame plate 58 and support bracket 62 to space the bearing means properly within the space available, with fasteners 80 securing the plate and bracket together.

Figure 5:
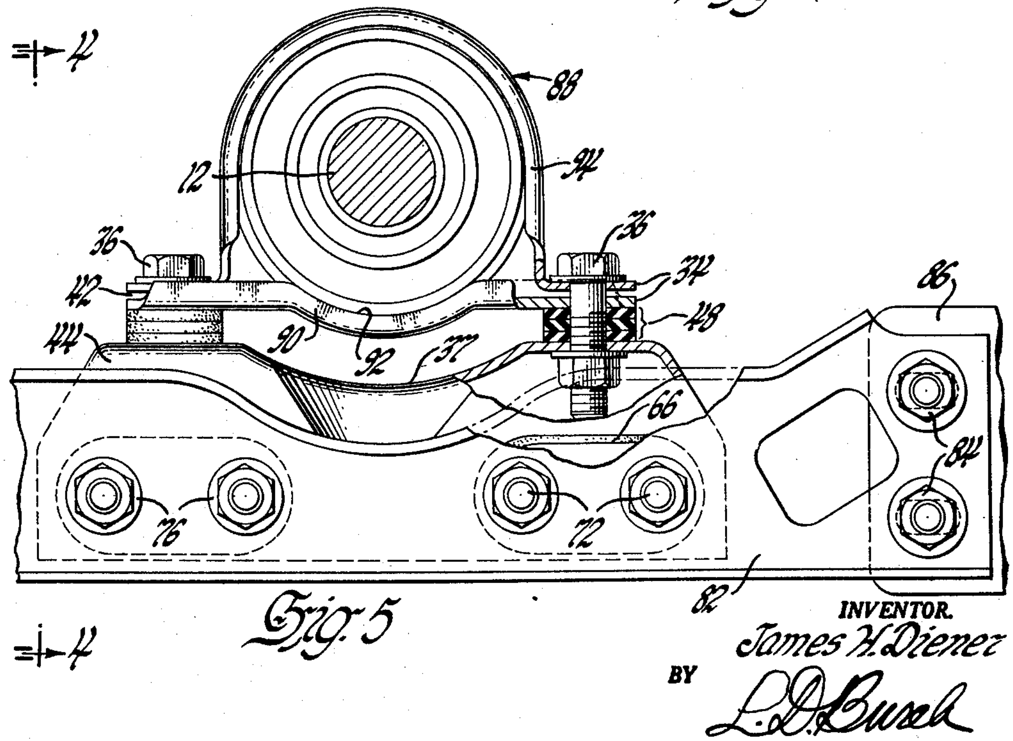
Figure 5 is an end view of the bearing support assembly shown by Figure 4, as seen in the plane of line 5—5 looking in the direction of the arrows thereon.

The bearing and retainer support means of Figures 4 and 5 differs in that a frame brace 82 acts as the support bracket and has the insulators 66 secured directly thereto. The frame brace is itself secured by fasteners 84 to receiving frame brackets 86.

The bearing retainer assembly 88 also differs to some extent in having the lowermost retainer band 90 extended almost straight across between the mounting pads of plate 44 with but a slight seating depression 92 provided therein, while the upper band 94 encompasses more of the circumference of the ball bearing member.

The insulators 66 support the weight of the drive shaft at the joint and retain the after end of the forward drive shaft section resiliently mounted for most efficient operation of the universal joint. Drive noises received from the drive axles, differential gears, etc., which would normally pass through a metal-to-metal type bearing support, are effectively isolated by the damper members 66 from reaching the vehicle frame and thereafter being transmitted to the vehicle body. Furthermore, the flexible restraint imposed upon the drive shaft serves to change the resonant character of the drive shaft and eliminate drive noise vibrations.

I claim:

1. A drive shaft bearing support comprising a ball bearing member receivable about the end of a drive shaft member, a bearing retainer disposed about said bearing member and engaged therewith, outwardly projected ears formed from said retainer, a support bracket including parallel spaced plates having vibration insulation means secured therebetween, one of said plates including mounting pads for having said ears of said bearing retainer secured thereto and disposing said retainer in otherwise spaced relation thereto, said other plate being adapted for securement to a frame member.

2. A drive shaft bearing support including a ball bearing member receivable about one end of a drive shaft member, a two-piece flanged section bearing retainer member clamped about said bearing member and having ears projected outwardly therefrom, a mounting plate including spaced flanges having said ears secured thereto and said retainer member otherwise disposed in spaced relation apart therefrom, a support bracket adapted to be secured to a frame member and having an upright flange disposed in parallel spaced relation to said mounting plate, and insulator members secured between said upright flange and mounting plate for preventing the transmission of drive noises from said shaft to said frame member.

3. A drive shaft bearing support comprising a ball bearing member receivable about the end of a drive shaft member, a bearing retainer including flanged section semicircular members receiving said bearing member therebetween and having cooperatively disposed ears adapted to be secured together for engaging said bearing member thereto, a mounting plate including fasteners for securing the respective ears of said bearing retainer members together and to said plate and disposing the main portion of said retainer in spaced relation to said plate, a support bracket including means for securing said bracket to a frame member and having a vertically disposed flange spaced apart from said mounting plate, and a pair of elongated insulators having fastener means extending from opposite faces thereof for securing said bracket and mounting plate together with said insulators disposed therebetween.

4. A drive shaft bearing support and drive noise insulator which includes a bracket member having a vertically disposed flange, a shaft receiving ball bearing and bearing retainer assembly including a depending flange, and a pair of insulator members secured to said vertically disposed flange and said depending flange and disposed therebetween, said insulators including elongated members of vibration damping character having metal discs bonded to opposite side faces thereof and separate threaded fasteners extended through said discs and on opposite sides of said insulators for attachment to said flanges, said vertically disposed flange having a resilient single mounting pad attachment for permitting limited lateral movement of said bearing and bearing retainer assembly relative to a frame member, said insulators being adapted to both support said bearing member and damp out objectionable drive noises otherwise transmitted to said bracket member.

References Cited in the file of this patent

UNITED STATES PATENTS

| | | |
|---|---|---|
| 2,175,978 | Swingle | Oct. 11, 1939 |
| 2,238,737 | Hunter | Apr. 15, 1941 |
| 2,467,994 | Ruist | Apr. 19, 1949 |